United States Patent
Tayal

(10) Patent No.: US 12,225,571 B2
(45) Date of Patent: Feb. 11, 2025

(54) 5G LINK SELECTION IN NON-STANDALONE NETWORK

(71) Applicant: INTERNATIONAL BUSINESS MACHINES CORPORATION, Armonk, NY (US)

(72) Inventor: Sagar Tayal, Ambala (IN)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 17/804,167

(22) Filed: May 26, 2022

(65) Prior Publication Data

US 2023/0413311 A1    Dec. 21, 2023

(51) Int. Cl.
*H04W 36/30*    (2009.01)
*H04W 24/02*    (2009.01)
*H04W 24/10*    (2009.01)
*H04W 72/542*    (2023.01)
*H04W 76/15*    (2018.01)

(52) U.S. Cl.
CPC ......... *H04W 72/542* (2023.01); *H04W 24/02* (2013.01); *H04W 24/10* (2013.01); *H04W 76/15* (2018.02)

(58) Field of Classification Search
CPC ..... H04W 24/02; H04W 24/10; H04W 28/26; H04W 72/54; H04W 72/542; H04W 76/15
See application file for complete search history.

(56) References Cited

U.S. PATENT DOCUMENTS

| | | |
|---|---|---|
| 2017/0289851 A1 | 10/2017 | Majmundar |
| 2018/0199355 A1 | 7/2018 | Wu |
| 2019/0182000 A1 * | 6/2019 | Futaki ............... H04W 72/0453 |
| 2019/0230515 A1 | 7/2019 | Quan |
| 2019/0239142 A1 | 8/2019 | Jia |

(Continued)

FOREIGN PATENT DOCUMENTS

| | | | | |
|---|---|---|---|---|
| CN | 111465061 B | * | 4/2022 | ........... H04B 17/309 |

OTHER PUBLICATIONS

5G Call Flows and Signaling—How a 5G UE performs Initial Access https://ourtechplanet.com/5g-call-flows-and-signaling-how-a-5g-ue-performs-inital-access/. Retrieved from the internet on Dec. 20, 2021.

(Continued)

*Primary Examiner* — Phuc H Tran
(74) *Attorney, Agent, or Firm* — Shackelford, McKinley & Norton, LLP

(57) ABSTRACT

A method, a system, and a computer program product for optimal link selection between user equipment and new radio stations in a non-standalone network. The method includes detecting a connection attempt by a user equipment to a non-standalone network that includes at least one base station and NR stations. The method also includes receiving connection data from the UE and connecting the UE to the base station. The method further includes determining an NR station from the NR stations based on channel quality measurements relating to the NR stations and the connection data of the UE using a prediction module that uses a machine learning model to predict the NR station. The channel quality measurements include cell range, uplink performance, cell capacity, and link quality. The method also includes connecting the UE to the NR station determined by the machine learning model.

20 Claims, 8 Drawing Sheets

(56) References Cited

U.S. PATENT DOCUMENTS

2020/0229078 A1* 7/2020 Shin .................. H04W 24/10
2021/0235326 A1   7/2021 Xing
2021/0235356 A1   7/2021 Lu
2021/0297928 A1   9/2021 Chowta
2023/0422130 A1* 12/2023 Chin ................. H04B 17/328

OTHER PUBLICATIONS

5GMobix—5G architecture and technologies for CCAM specifications, 221 pages. https://www.5g-mobix.com/assets/files/5G-MOBIX-D2.2-5G-architecture-and-technologies-for-CCAM-specifications-V1.0.pdf. Retrieved from the internet on Mar. 10, 2022.

Mell et al., "The NIST Definition of Cloud Computing," Recommendations of the National Institute of Standards and Technology, U.S. Department of Commerce, Special Publication 800-145, Sep. 2011, 7 pgs.

Timing Advance (TA) in LTE, (2015) 4GNation.com, http://4gnation.blogspot.com/2015/09/timing-advance-ta-in-lte.html. Retrieved from the internet on Dec. 20, 2021.

Yin, Hao & Guo, Xiaojun & Liu, Pengyu & Hei, Xiaojun & Gao, Yayu. (2020). Predicting Channel Quality Indicators for 5G Downlink Scheduling in a Deep Learning Approach. https://www.researchgate.net/publication/343414360.

* cited by examiner

5G LINK SELECTION IN NON-STANDALONE NETWORK

BACKGROUND

The present disclosure relates to 5G connectivity, and more specifically, to a method of optimal link selection between a user equipment and a 5G new radio station in a non-standalone network.

The fifth generation, or 5G, technology refers to the standard for broadband cellular networks in which the service area is divided into small geographical areas called cells. 5G wireless devices in a cell communicate by radio waves with a cellular base station via fixed antennas, over frequency channels assigned by the base station.

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a New Radio (NR) BS, a 5GNode B, and/or the like.

Non-standalone 5G is the model of deployment where the 5G Radio Access Network (RAN) and its New Radio (NR) interface are used in conjunction with the existing LTE and EPC infrastructure Core Network (respectively 4G Radio and 4G Core), thus making the NR technology available without Core network replacement. In this configuration, only the 4G services are supported, but enjoying the capacities offered by the 5G New Radio (lower latency, etc). Non-standalone is also known as "E-UTRA-NR Dual Connectivity (EN-DC)" or "Architecture Option 3".

SUMMARY

Embodiments of the present disclosure include a method for optimal link selection between user equipment and new radio stations in a non-standalone network. The method includes detecting a connection attempt by a user equipment to a non-standalone network that includes at least one base station and NR stations. The method also includes receiving connection data from the UE and connecting the UE to the base station. The method further includes determining an NR station from the NR stations based on channel quality and performance measurements relating to the NR stations and the connection data of the UE using a prediction module that uses a machine learning model using historical and real-time data to predict the optimal NR station. The channel quality measurements include cell range, uplink performance, cell capacity, UE capabilities and link quality. The method also includes connecting the UE to the NR station determined by the machine learning model.

Additional embodiments include a computer program product for optimal link selection between user equipment and new radio stations in a non-standalone network, one or more computer-readable storage medium, and program instructions stored on the one or more computer-readable storage media, the program instruction executable by a processor to cause the processor to perform a method. The method includes detecting a connection attempt by a user equipment to a non-standalone network that includes at least one base station and NR stations. The method also includes receiving connection data from the UE and connecting the UE to the base station. The method further includes determining an NR station from the NR stations based on channel quality measurements relating to the NR stations and the connection data of the UE using a prediction module that uses a machine learning model to predict the NR station. The channel quality measurements include cell range, uplink performance, cell capacity, and link quality. The method also includes connecting the UE to the NR station determined by the machine learning model.

Further embodiments of the present disclosure include a system product for optimal link selection between user equipment and new radio stations in a non-standalone network. The system includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
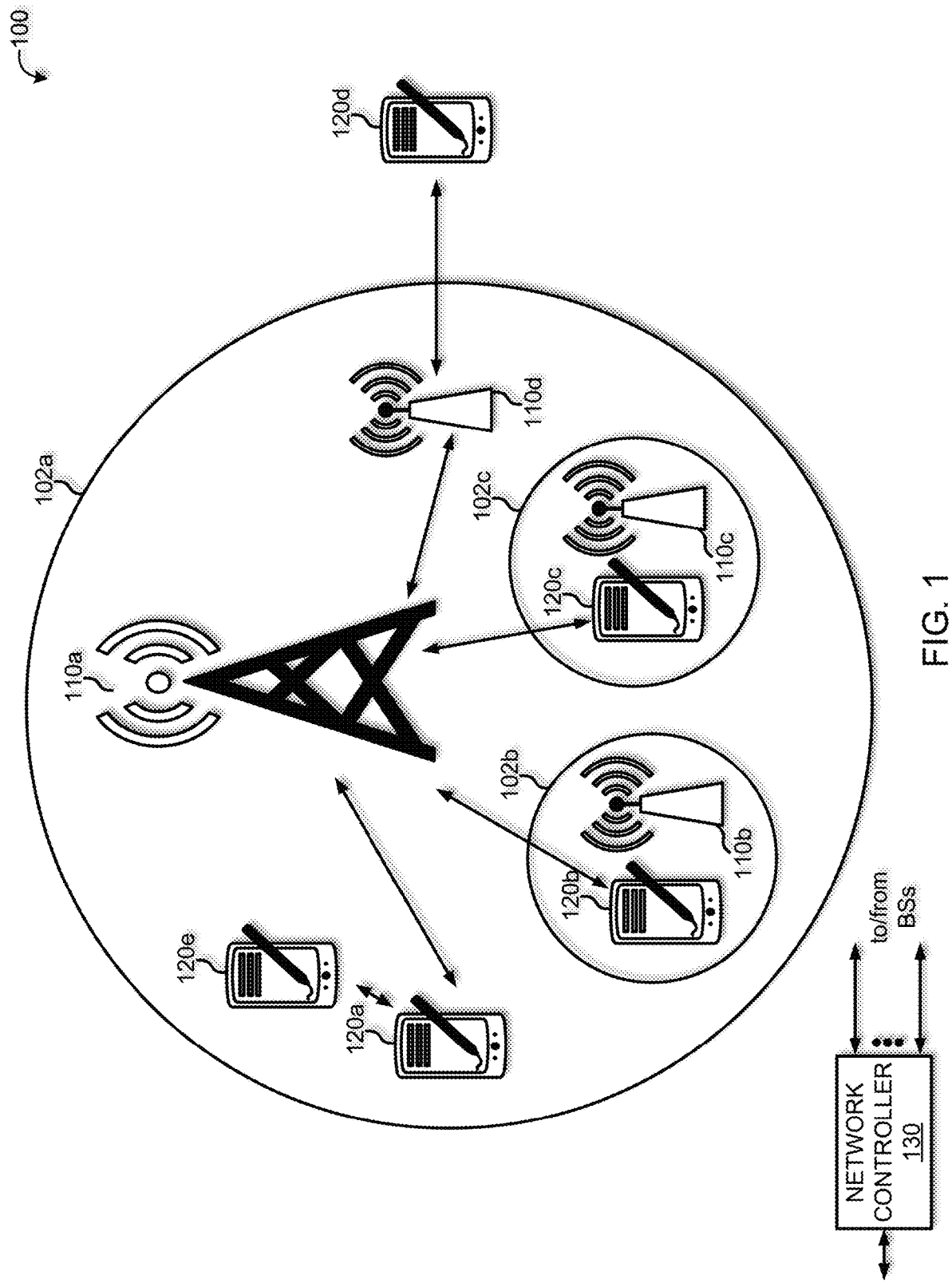
FIG. 1 is a block diagram illustrating an operation of the primary operational elements of a wireless network used by one or more embodiments of the present disclosure.

While the present disclosure is amenable to various modifications and alternative forms, specifics thereof, have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to 5G connectivity, and more specifically, to a method of optimal link selection for a user equipment in a non-standalone architecture. While the present disclosure is not necessarily limited to such applications, various aspects of the disclosure may be appreciated through a discussion of various examples using this context.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

5G can be deployed in five different deployment options, where standalone options consist of only one generation of radio access technology and non-standalone options consist of two generations of radio access technologies (4G LTE and 5G). Deployments of 5G can adopt either the non-standalone option or standalone option as the standardization of these two options has already been completed.

The non-standalone 5G approach utilizes E-UTRAN New Radio-Dual Connectivity (EN-DC) technology to enable the introduction of 5G services and data rates in a predominantly 4G network. User equipment (UE) supporting EN-DC can connect simultaneously to an LTE Master Node eNB (MN-eNB) and 5G-NR Secondary Node gNB (SN-gNB). This approach permits cellular providers to roll out 5G services without the expense of a full scale 5G Core Network. 5G gNBs can be introduced early in areas with high traffic congestion or areas where higher data throughput requirements.

An EN-DC enabled UE first registers for service with the 4G EPC. The UE also starts reporting measurements on 5G frequencies. If the downlink signal quality for the UE will support a 5G service, the LTE eNB communicates with the 5G-NR gNB to assign resources for a 5G bearer. The 5G-NR resource assignment is then signaled to the UE via an LTE RRC Connection Reconfiguration message. Once the RRC Connection Reconfiguration procedure is completed, the UE simultaneously connects to the 4G and 5G networks.

A UE as used herein, is a non-limiting term refers to any type of wireless device communicating over a wireless radio interface with a radio access node such as eLTE ENB, LTE eNB, 5G/NR gNB, WiFi Access point, AP, and connecting to core network nodes over a network interface (e.g., non-access stratum, NAS, or other signaling protocol). Example of network nodes include MME if EPC network, MM entity and SM entity in NGCN. UE also communicate with other network nodes such as Access Network Discovery and selection function, ANDSF, Proxy Call and Session Control function. PCSCF in IP Multimedia Subsystem, IMS, etc. The UE may also communicate with other UEs in a cellular or mobile communication system. Examples of a UE include a Personal Digital Assistant (PDA), a tablet, mobile terminals, a smart phone, laptop Embedded Equipment (LEE), Laptop Mounted Equipment (LME), Universal Serial Bus (USB) dongles, and the like.

Radio access nodes may communicate with each other, e.g., via an interface (e.g., X2 in LTE or similar interface). The radio access nodes (e.g., LTE eNB, ELTE ENB, GNB) are also capable of communicating with control plane network entities (e.g., MME, MM entity, SM entity, etc.) via control plane interfaces (e.g., S1-AP/MME). The radio access nodes are additionally communicating with user plane network entities (e.g., service gateway, SGW, NGCN user plane, UP, functions, etc.) over the respective user plane interfaces (e.g., S1-U). The radio access nodes supporting different access technologies may be collocated in the same physical node. For example, a base station may support LTE and NR or eLTE and NR or LTE and eLTE. When in collocated mode, the handover from NR to EUTRA may be handled as an intra-node handover to optimize some signaling.

When establishing a 5G connection in a non-standalone network, the UE and network perform initial protocol level signaling transactions and the UE prepares the default bearer with LTE network and connects to LTE RAN & EPC network portion of the network. If the UE support 5G, the LTE base station can provide the NR-ARFCN that the UE can now monitor with the help of RRC messages. If the UE finds the downlink signal quality beyond a certain threshold (defined as B1) it can notify the LTE base station. The LTE base station can communicate with the NR base station to assign resources for a 5G bearer in the X2 signaling. The 5G-NR resource assignment is then signaled to the UE via an LTE with an RRC Connection Reconfiguration message. Once the RRC Connection Reconfiguration procedure is completed, the UE achieves the downlink synchronization by checking PSS, SSS & Broadcast signals. After this UE performs UL synchronization by sending Random access preamble. The NR station can measure the cell range with the help of preamble format. If the UE is in an allowable range, a UL sync is performed and data flow is allowed with NR station.

Limitations on connecting UEs to NR stations in non-standalone networks remain, however, as UEs may be uplink limited as only downlink coverage is considered when connecting to NR stations. The uplink limitations can be due to, for instance, cell range configurations or battery transmission power limitations. Additionally, 5G cell capacity is not taken into consideration due to static algorithms being used when selecting an NR station. Other factors not being considered include link fluctuations between the LTE and 5G connections, mesh level (location data) data aggregation that can provide insights into NR stations, success rates of link additions, and more specifically, to success rates using time-based granularity. Currently, the non-standalone connection process can lead to additional signaling that can cause expensive spectrum resource wastage on the RAN, X2 link congestion, and increased device battery consumption due to excessive signaling with the LTE enodeB and the 5G NR leg.

Embodiments of the present disclosure may overcome the above, and other problems, by providing a process and system for optimal link selection in non-standalone architecture using machine learning models. When establishing an optimal connection with an NR station, other consideration beyond downlink coverage should be considered. Instead, embodiments utilize a range of parameters including cell range, uplink performance, device transmission power, 5G cell capacity, link quality, and the like. Additionally, the machine learning models can also utilize mesh level data aggregation to receive insights regarding the performance of the NR stations within the architecture. In addition to mesh level data, or location data, the machine learning model can also consider additional information. This information includes, but is not limited to, the success rates of link additions to each of the NR stations using time-based granularity. For example, success rates may differ at 4 A.M. and 6 P.M. and those success rates at different times at a specific NR station can also be considered.

More specifically, embodiments of the present disclosure apply a machine learning model that utilizes data derived from a wireless network to determine an optimal link selection between user equipment and NR stations in a non-standalone network. The machine learning model can be trained using channel quality measurements taken from the NR stations and connection data from the UEs. The machine learning model can predict an optimal NR station based on those features that can then be used to connect a UE to a wireless network and provide 5G coverage and services.

Embodiments also include a measurement module configured to obtain channel quality measurements and connection data from a wireless network. The measurement module can be configured to obtain the channel quality measurements from multiple NR stations within the wireless network that can serve the UE in the radio access network.

Embodiments also include a training module configured to train a base machine learning model to determine an optimal NR station when establishing a 5G connection for a UE. The training module can utilize training data derived from the information obtained by the measurement module. Additional embodiments include a prediction module configured to deploy the trained machine learning model in a real-time environment of a wireless network. The trained machine learning module can select the optimal NR stations when a UE attempts to establish a 5G connection in the wireless network.

In some embodiments, the prediction module is further configured to request updated channel quality measurements of the NR stations. The prediction module can make predictions of an optimal NR station based on the channel quality at a particular time. Since the optimal NR station may change as the UE's mobility state may change and/or capacity constraints arise within the NR station, information regarding the predicted NR station can be updated continuously to make adjustments as needed.

In some embodiments, the trained machine learning model predicts an optimal NR station that is not collocated with the LTE base station the UE is connected to. This can be due to, for example, other cells with better coverage availability, better capacity availability, or due to the type of configuration set proposed by the machine learning model. When an optimal NR station is not collocated with an LTE station, the LTE station may require location attributes to measure the distance between the UE location and the targeted NR station. The measured distance can be utilized by the machine learning model in making a determination on optimal link selection.

In some embodiments, both the LTE & NR stations are collocated. In those instances, immediately after the UE notifies its 5G NSA (Non-standalone) support capability and when it sends the timing advance message, the prediction module, capable of measuring the distance, can check if current UE distance is within a predetermined allowed device distance. If the distance is within the allowed UE distance, the rest of the signaling to connect NR station is followed. However, if the distance is greater than allowed UE distance, the prediction module can instruct the LTE station to block the 5G NR station addition by sending RACH-Block parameter for RACH-Not Attempted (RACH-NA) timer. This can assist the UE to know that once the timer RACH-Not Attempted (RACH-NA) has expired it can reattempt to latch to the NR station.

In some embodiments, the prediction module continuously monitors the UE timing advance. A base station can measure the required timing advance based on the received UE signal arrival time. The base station can command the UE to adjust the transmission. Base station after receiving analysis from prediction model, signals the MAC control element which is capable of handling special control information & this special MAC structure is implemented as special bit string in LCID field of MAC header. After UE reads the MAC structure and if it observes whether the timing advance is not within allowable range. In case it is not in allowed range then RACH-Block parameter is applied for RACH-Not Attempted (RACH-NA) timer. In case timing advance is within allowable range then UE can add the NR station as per downlink coverage.

In some embodiments, both the LTE station and the NR station are non-collocated. In those instances, the UE can provide a measurement report containing the NR stations on which it would be attempting 5G NR connection. The prediction module, capable of measuring the distance between the UE and the 5G station, can check the distance between the NR stations mentioned in the report and the current UE location. If the UE is within the allowed device distance, then the rest of the signaling to connect to the NR station is followed for the prioritized NR station. However, if the UE distance is greater than the allowed device distance, the prediction module can instruct the LTE station to block the NR station addition by sending a RACH-Block parameter for RACH-Not attempted (RACH-NA) timer. This can assist UEs know not to report the same blocked NR station in their measurement report for RACH-Not attempted (RACH-NA) timer.

FIG. 1 is a diagram illustrating an example of a wireless network 100, in accordance with various aspects of the present disclosure. The wireless network 100 can include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a eNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5GNB", and "cell" may be used interchangeably herein.

In some embodiments, a cell may not necessarily be stationary, and the geographic area of the cell may move according to the location of a mobile BS. In some embodiments, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A EE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some EEs may be considered Internet-of-Things (IoT) devices, and/or may be implemented as NB-IoT (narrowband internet of things) devices. Some EEs may be considered a Customer Premises Equipment (CPE). UE 120 may be included inside a housing that houses components of UE 120, such as processor components, memory components, and/or the like. In some embodiments, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some embodiments, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

It is noted that FIG. 1 is intended to depict the major representative components of a wireless network 100. In some embodiments, however, individual components may have greater or lesser complexity than as represented in FIG. 1, components other than or in addition to those shown in FIG. 1 may be present, and the number, type, and configuration of such components may vary.

Figure 2:
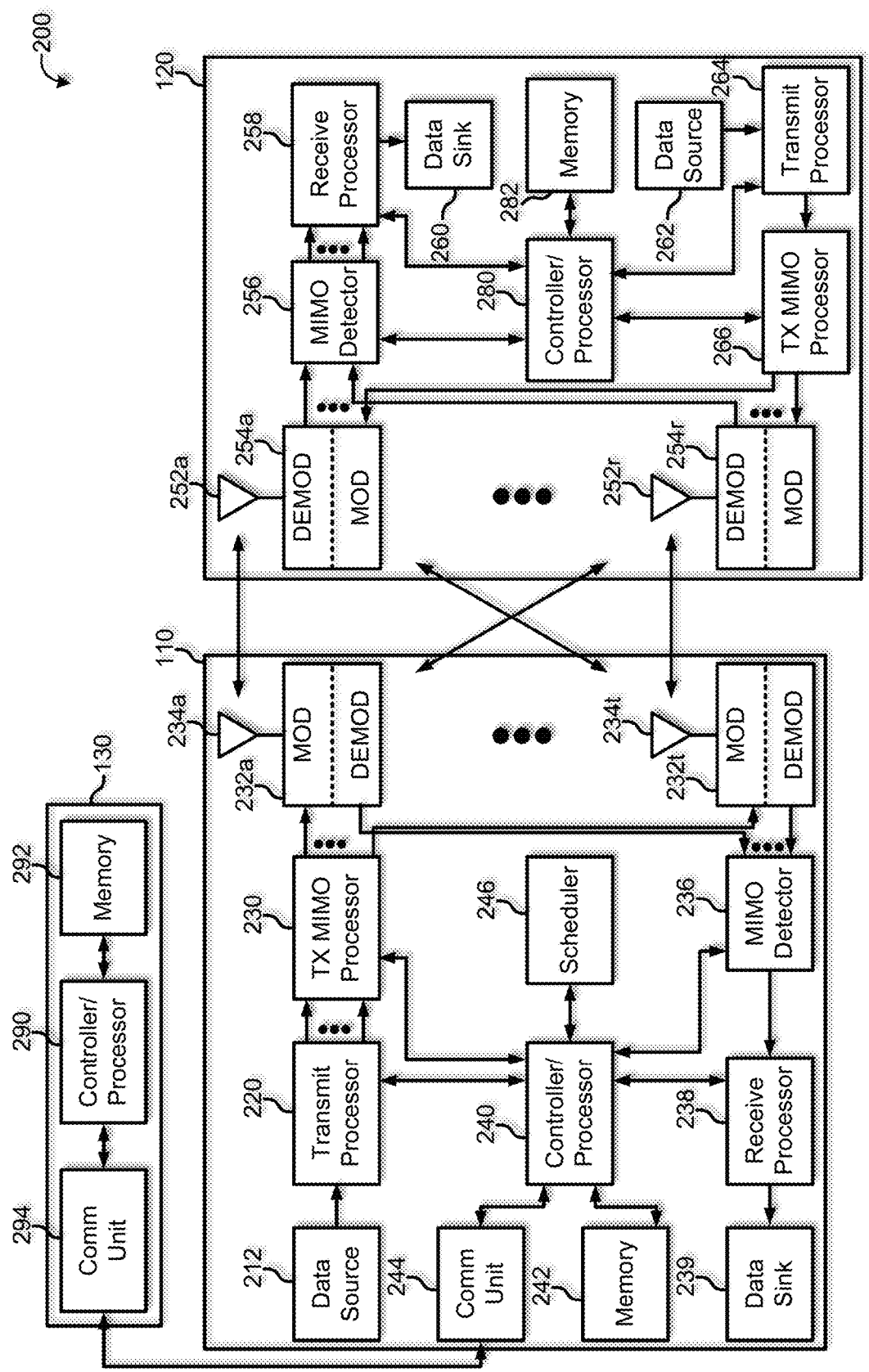
FIG. 2 is a block diagram illustrating a wireless connectivity between a base station and a user equipment used by one or more embodiments of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, down convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some embodiments, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some embodiments, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some embodiments, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with determining an optimal link selection between a UE and an NR station, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. In some embodiments, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, and/or other processes as described herein. In some embodiments, executing instructions may include running the instructions, converting the instructions, compiling the instructions, interpreting the instructions, and/or the like.

It is noted that FIG. 2 is intended to depict the major representative components of a base station 110 in communication with a UE 120 in a wireless network 100. In some embodiments, however, individual components may have greater or lesser complexity than as represented in FIG. 1, components other than or in addition to those shown in FIG. 1 may be present, and the number, type, and configuration of such components may vary.

Figure 3:
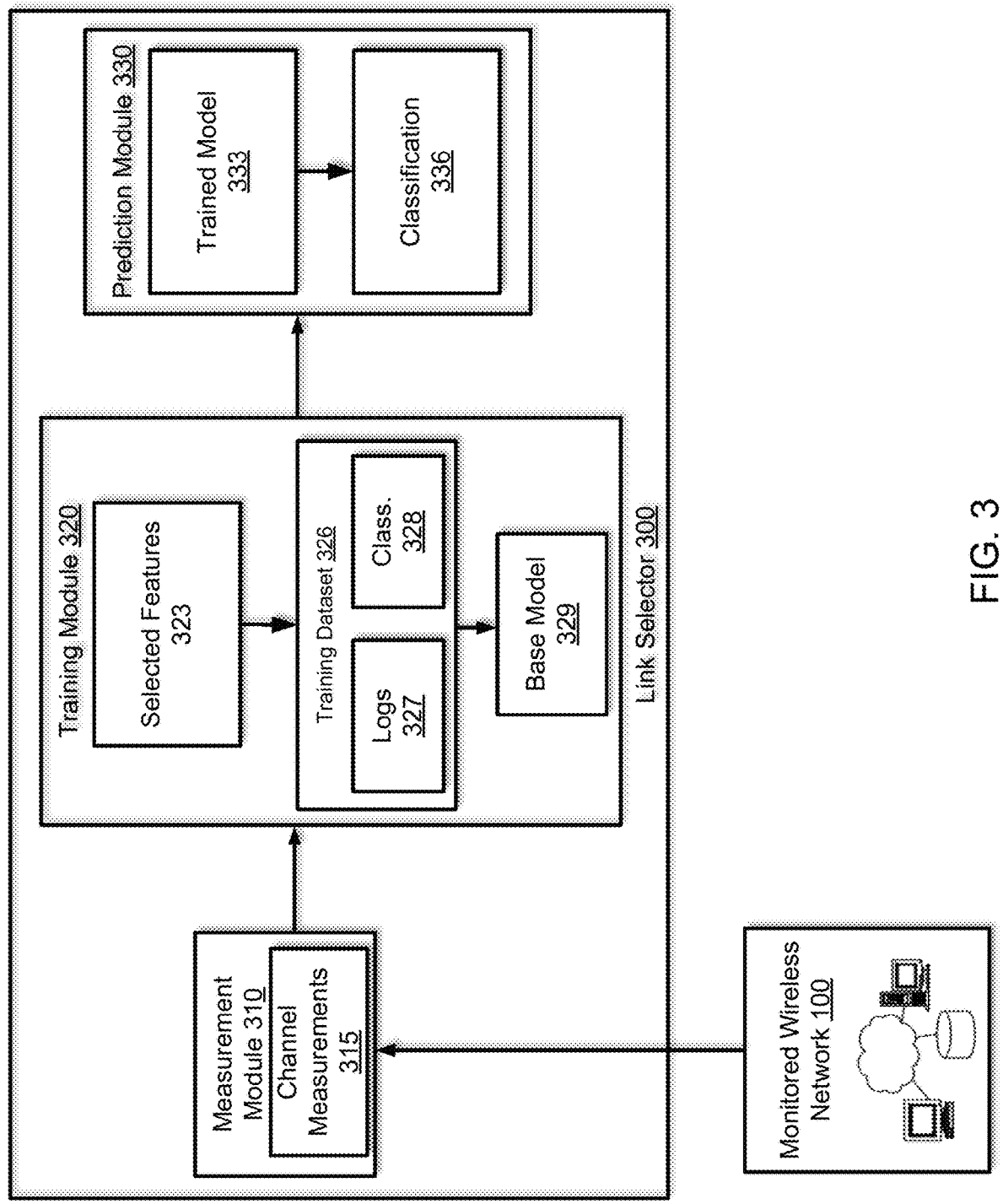
FIG. 3 is a block diagram illustrating a link selector use by one or more embodiments of the present disclosure.

FIG. 3 is a block diagram illustrating an operation of primary operational elements of an improved link selector 300 for optimal link selection between user equipment and new radio stations in a non-standalone network, in accordance with embodiments of the present disclosure. The link selector 300 includes a measurement module 310, a training module 320, and a prediction module 330. The measurement module includes channel quality measurements taken from the base stations 110 in the wireless network 100. The training module includes selected features 323, a training dataset 326, and a base machine learning model 329. The prediction module 330 includes a trained machine learning model 333 and the classifications 336 produced by the trained machine learning model 333. For purposes of the present description, it will be assumed that the illustrative embodiments are being implemented as part of a wireless network mechanism and specifically are directed to link selection between a UE and an NR station in a non-standalone network. However, this is only one possible implementation, and is not intended to be limiting on the present disclosure. Other implementations in which optimal link determination is identified, may also be used without departing from the spirit and scope of the present disclosure.

The measurement module 310 is a component of the link selector 300 configured to obtain data from the wireless network 100. The obtained data includes, for example, channel quality measurements taken from each of the NR stations within the wireless network 100 and connection data provided by UEs connected to the wireless network 100. The channel quality measurements include cell range, uplink performance, cell capacity, and link quality for each of the NR stations. The connection data includes UE battery capacity, UE type, processor type, configuration, and geo-location for each UE connected to the wireless network 100.

In order to dynamically select an optimal link between a UE and an NR station during runtime operation, the training module 320 is required to train the base model 329 using features derived from the channel quality measurements and/or connection data (e.g., UE connection data) so that it the base model 329 can produce a classification that selects an NR station within the wireless 100 to connect a UE to.

With regard to the training of the base model 329, a training dataset 326 is provided by a training dataset source (not shown). The training data in the training dataset 326 includes training data entries, representing wireless network log entries, which each may represent channel quality measurements (e.g., cell range, uplink performance, cell capacity, and link quality) taken from NR stations and UE connection data (e.g., battery capacity). Each training data entry also has a corresponding classification for that training data entry, e.g., an NR station selection. Additionally, the training dataset 326 include having entries, e.g., logs 327, data instances, etc. that represent measurement data taken from the wireless network 100, along with their corresponding correct classifications 336, or ground truth classifications.

The base model 329 is a component of the link selector 300 configured as a machine learning model and trained to identify optimal links between a UE and the NR stations in the wireless network 100. The base model 329 can be configured as various types of ML models. These ML models include convolutional neural networks (CNNs), deep neural networks (DNNs), recurrent neural networks (RNNs), or other types of machine learning models. For example, the base model 329 can be a deep learning model, a random forest model, a gradient boost model, a support vector machine, and the like. The base model 329 is trained to classify the input as to which NR station in the wireless network 100 to connect a UE to. It should be noted, this is only one possible implementation, and it should be appreciated that other embodiments may be configured to provide classifications of different levels of granularity, and complexity. For example, the base model 329 can provide individual classifications for different degrees of NR stations such as vector outputs in which each vector slot corresponds to a different classification and values in each of the vector slots indicate a probability that the corresponding classification applies to the particular inputs. Once trained, the training module 320 can provide the model, as the trained model 333, to the prediction module 330 for deployment within wireless network 100.

The prediction module 330 is a component of the link selector 300 configured to deploy the trained machine learning model 333 in a real-time environment of the wireless network 100 to provide optimal link selections between UEs and NR stations. Additionally, the prediction module 330 is configured to calculate distances between LTE stations, NR stations, and UEs based on their location respective of each other. The trained machine learning model 333 can factor in the distances, in addition to the channel quality measurements and connection data, when making a determination on an optimal NR station.

The trained machine learning model 333 is configured as a machine learning model and trained to identify optimal link selections between UEs and NR stations. The trained model 333 can be configured as various types of ML models. These ML models include CNNs, DNNs, RNNS, or other types of machine learning models. For example, trained model 333 can be a deep learning model, a random forest model, a gradient boost model, a support vector machine, and the like. The base model 329 is trained to classify the input as to which NR station in the wireless network 100 to connect a UE to. It should be noted, this is only one possible implementation, and it should be appreciated that other embodiments may be configured to provide classifications of different levels of granularity, and complexity. For example, the trained model 333 can provide individual classifications for different degrees of NR stations such as vector outputs in which each vector slot corresponds to a different classification and values in each of the vector slots indicate a probability that the corresponding classification applies to the particular inputs. Using at least the channel quality measurements 315, the trained model 333 can select the NR station that can provide the optimal 5G performance for a UE. The selected NR station can be considered as the classification 336 with an included confidence level of the selection.

It is noted that FIG. 3 is intended to depict the major representative components of an improved link selector 300. In some embodiments, however, individual components may have greater or lesser complexity than as represented in FIG. 3, components other than or in addition to those shown in FIG. 3 may be present, and the number, type, and configuration of such components may vary.

Figure 4:
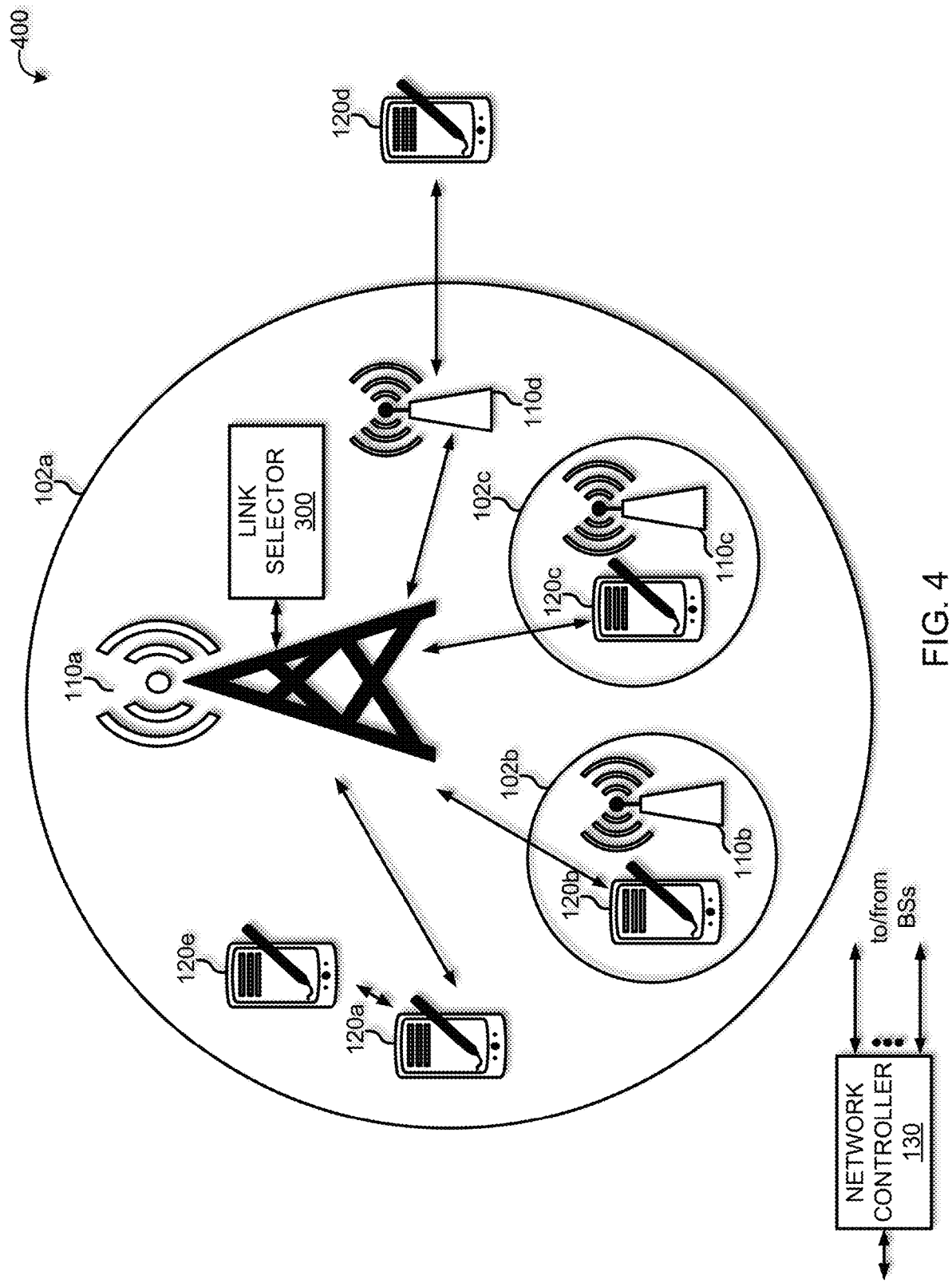
FIG. 4 is a block diagram illustrating an operation of the primary operational elements of a link selector in a wireless network and used by one or more embodiments of the present disclosure.

Having trained the trained machine learning model 333, for the prediction module 330, in the manner described above, during runtime operation, as shown in FIG. 4, the trained model 333 can receive incoming data from the measurement module 310 in the form of a logged data relating to the operation of the wireless network 100 having a plurality of computing system resources, e.g., hardware and/or software resources, data structures, and the like, where the incoming logged data includes logs which may represent channel quality measurements relating to the NR stations and/or connection data relating to UEs.

The prediction module 330, using the trained machine learning model 333, can generate a prediction of a classification of the incoming log corresponding to a NR station to connect a connecting UE to. This process may be repeated for each UE establishing a 5G connection within the wireless network 100 using their corresponding connection data such that a plurality of classifications, one for each of the UEs establishing a connection, may be generated. In some illustrative embodiments, a combination of these classifications may be used to generate a single classification for a group of UEs within an area as a whole. In some cases, probability/confidence values or scores may be applied to the classification to provide additional insight on which NR station to use.

In some embodiments, both the LTE & NR stations are collocated. In those instances, immediately after the UE notifies its 5G NSA support capability and when it sends the timing advance message, the prediction module, capable of measuring the distance, can check if current UE distance is within a predetermined allowed device distance. If the distance is within the allowed device distance, the rest of the signaling to connect NR station is followed. However, if the distance is greater than allowed device distance, the prediction module can instruct the LTE station to block the 5G NR station addition by sending RACH-Block parameter for RACH-Not attempted (RACH-NA) timer. This can assist the UE to know that once the timer RACH-Not attempted (RACH-NA) has expired it can reattempt to latch to NR station.

In some embodiments, the prediction module continuously monitors the UE timing advance. A base station can measure the required timing advance based on the received UE signal arrival time. The base station can command the UE to adjust the transmission. It is signaled by means of a special MAC control element; LCID and then it can instruct the device in case its allowed & Timing advance is in allowable range then 'Qoffset' is removed, and the UE can add that collocated NR station as per downlink coverage. The base station, after receiving analysis from prediction model, signals the MAC control element which is capable of handling special control information & this special MAC structure is implemented as special bit string in LCID field of MAC header. After UE reads the MAC structure & if it observes whether the timing advance is not within allowable range. In case it is not in allowed range then RACH-B lock parameter is applied for RACH-Not Attempted (RACH-NA) timer. In case timing advance is within allowable range then UE can add the NR station as per downlink coverage.

In some embodiments, both the LTE station and the NR station are non-collocated. In those instances, the UE can provide a measurement report containing the NR stations on which it would be attempting 5G NR connection. The prediction module, capable of measuring the distance between the UE and the 5G station, can check the distance between the NR stations mentioned in the report and the current UE location. If the UE is within the allowed device distance, then the rest of the signaling to connect to the NR station is followed for the prioritized NR station. However, if the UE distance is greater than the allowed device distance, the prediction module can instruct the LTE station to block the NR station addition by sending a RACH-Block parameter for RACH-Not attempted (RACH-NA) timer. This can assist UEs know not to report that NR station in their measurement report for RACH-Not attempted (RACH-NA) timer.

The resulting classification output 336 generated by the trained machine learning model 333 be output to the wireless network 100 or other downstream computing system (e.g., base station 110) for performance of a responsive action. The responsive action may take any known or later developed form including output corresponding to a recommendation on which NR station to use. A report can also be generated detailing the recommendations and transmitted to a computer and displayed on a user interface. The user interface may comprise user interface elements for drilling down into the details of the report, including identifying the features within the data and their corresponding classifications by the trained machine learning model 333. In this way, a human analyst may identify which features contributed to an NR station classification. This can assist analysts in determining ways to improve the overall performance of the wireless network 100. Moreover, probability/confidence values, weighting values, and the like, for the classifications of the data may be provided in the report to indicate more basis for the classification. Additionally, in some embodiments, user interface elements may be provided for allowing a user to provide input to indicate a correctness/incorrectness of the classification of the data such that this information may be stored for creation of new training datasets for updating the training of the base model 329 at a future time.

Thus, the illustrative embodiments provide mechanisms for dynamic and optimal link selection between user equipment and new radio stations in a non-standalone network. Additionally, the mechanisms of the illustrative embodiments may operate in conjunction with RANs, Core networks, wireless networks 100 and/or other downstream computing systems to perform responsive actions in the event that a classification indicates a link selection of a UE, which may include outputting notifications via user interfaces that may provide functionality for drilling down into the details of the data, channel quality measurements, connection data, and the like.

Figure 5:
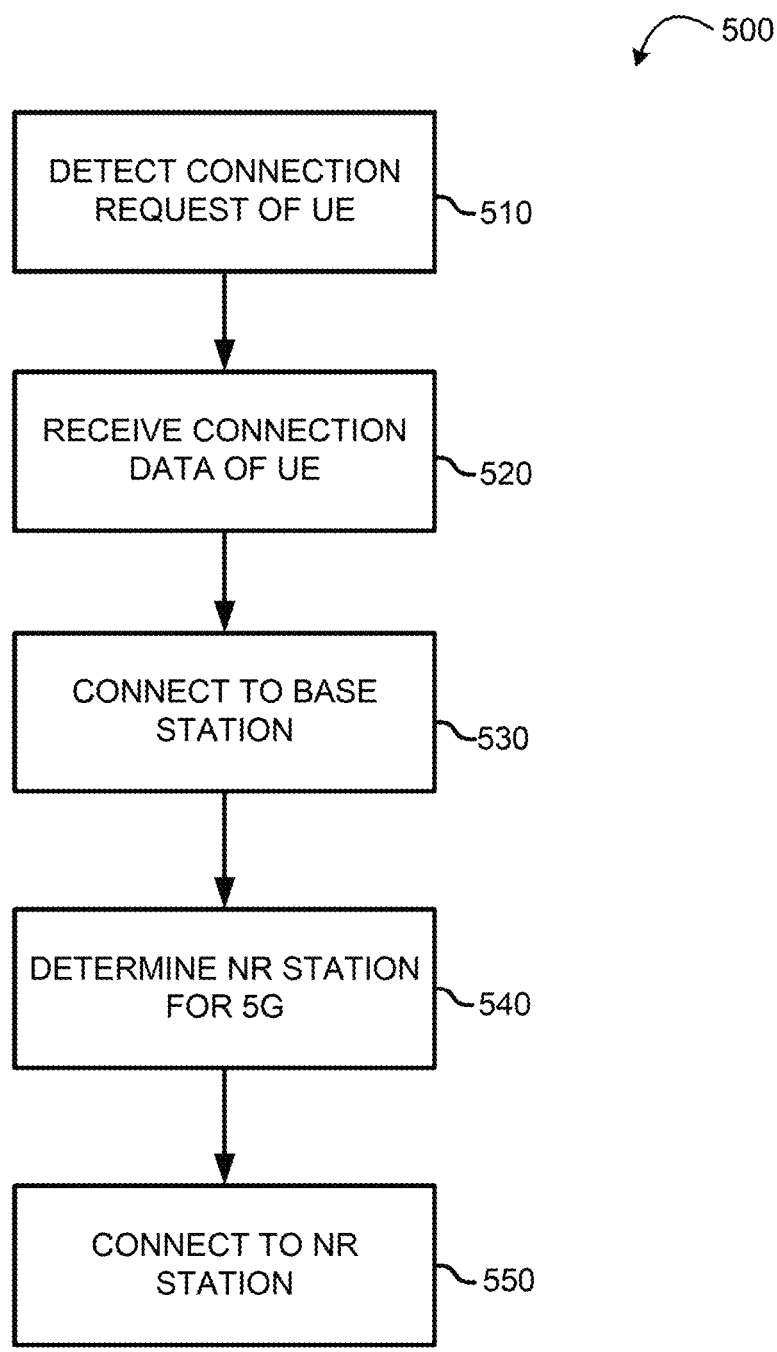
FIG. 5 is a flow diagram illustrating a process of optimal link selection between a new radio station and a user equipment and performed in accordance with embodiments of the present disclosure.

FIG. 5 is a flow diagram illustrating a process 500 of optimal link selection between user equipment and NR stations in a non-standalone network, in accordance with embodiments of the present disclosure. As shown in FIG. 5, the process 500 begins by detecting a connection attempt by a UE attempting to establish a connection in a non-standalone network. The non-standalone network includes a base station and at least one NR station. This is illustrated at step 510.

The measurement module 315 receives connection data relating to the UE and channel quality measurements relating to the NR stations. This is illustrated at step 520. The channel quality measurements of the NR stations can include cell range, uplink performance, cell capacity, and link quality. The connection data can include battery capacity, device type, processor type, configuration, and geo-location of the UE. The UE connects to the base station. This is illustrated at step 530. The base station can be an LTE station that provides the initial connection prior to connecting to the 5G leg of the non-standalone network.

The prediction module 330, using a trained machine learning model 333, determines an optimal NR station from the NR stations in the non-standalone network to establish a connection with the UE. This is illustrated at step 540. The determination, or prediction, can be based, at least partially, on the channel quality measurements and the connection data obtained by the measurement module. The non-standalone network connects the UE to the NR station predicted by the trained machine learning model. This is illustrated at step 550.

In some embodiments, the prediction module 330 periodically receives, via the measurement module 310, updated channel quality measurements of the NR stations. The machine learning model 333 can evaluate the updated channel quality measurements. The evaluation can be used in determining which of the NR stations to connect the UE to at a particular time of day. For example, success rates may differ at 4 A.M. and 6 P.M. and those success rates at different times at a specific NR station can also be considered.

In some embodiments, the prediction module 330 periodically receives, via the measurement module 310, a timing advance from the UE. Timing advance is used to control the uplink transmission timing of an individual UE. It can help ensure that uplink transmissions from all UE are synchronized when received by the base station. The prediction module 330 can evaluate the timing advance using the trained machine learning model 333. The timing advance be use used, in conjunction with the channel quality measurement and connection data, in determining which of the NR stations to connect the UE to if conditions change such that the UE requires connection to a different NR station.

In some embodiments, the prediction module 330 maintains a blacklist of other NR stations that should not be used when establishing a connection with the UE. The blacklist can be based on the location and distance between the NR station, base station, and UE. In cases where the distance is beyond an allowed range, the prediction module 330 can add the NR stations out of range to the blacklist. Thus, the prediction module 330 can historical data along with the performance and configuration data to determine the feasibility of the NR station when establishing a connection.

Figure 6:
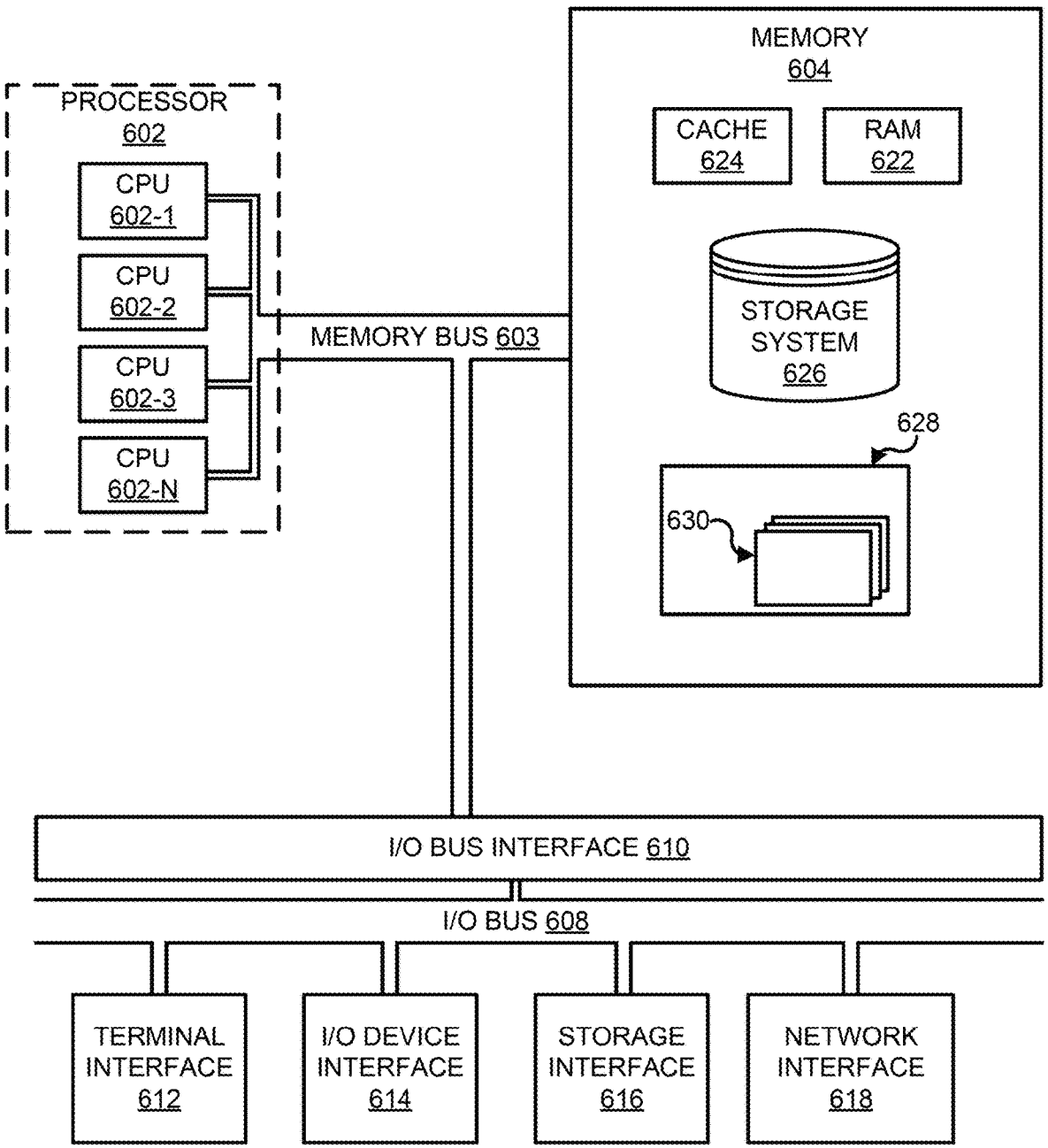
FIG. 6 is a high-level block diagram illustrating an example computer system that may be used in implementing one or more of the methods, tools, modules, and any related functions, described herein in which the disclosure may be implemented.

Referring now to FIG. 6, shown is a high-level block diagram of an example computer system 600 (e.g., the link selector 300) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 600 may comprise one or more processors 602, a memory 604, a terminal interface 612, an I/O (Input/Output) device interface 614, a storage interface 616, and a network interface 618, all of which may be communicatively coupled, directly or indirectly, for inter-component communication via a memory bus 603, an I/O bus 608, and an I/O bus interface 610.

The computer system 600 may contain one or more general-purpose programmable central processing units (CPUs) 602-1, 602-2, 602-3, and 602-N, herein generically referred to as the processor 602. In some embodiments, the computer system 600 may contain multiple processors typical of a relatively large system; however, in other embodiments, the computer system 600 may alternatively be a single CPU system. Each processor 602 may execute instructions stored in the memory 604 and may include one or more levels of onboard cache.

The memory 604 may include computer system readable media in the form of volatile memory, such as random-access memory (RAM) 622 or cache memory 624. Computer system 600 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the processors 602, the memory 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interface units, multiple I/O buses, or both. Further, while multiple I/O interface units are shown, which separate the I/O bus 608 from various communications paths running to the various I/O devices, in other embodiments, some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the major representative components of an exemplary computer system 600. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 (e.g., the link selector 300), may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 7:
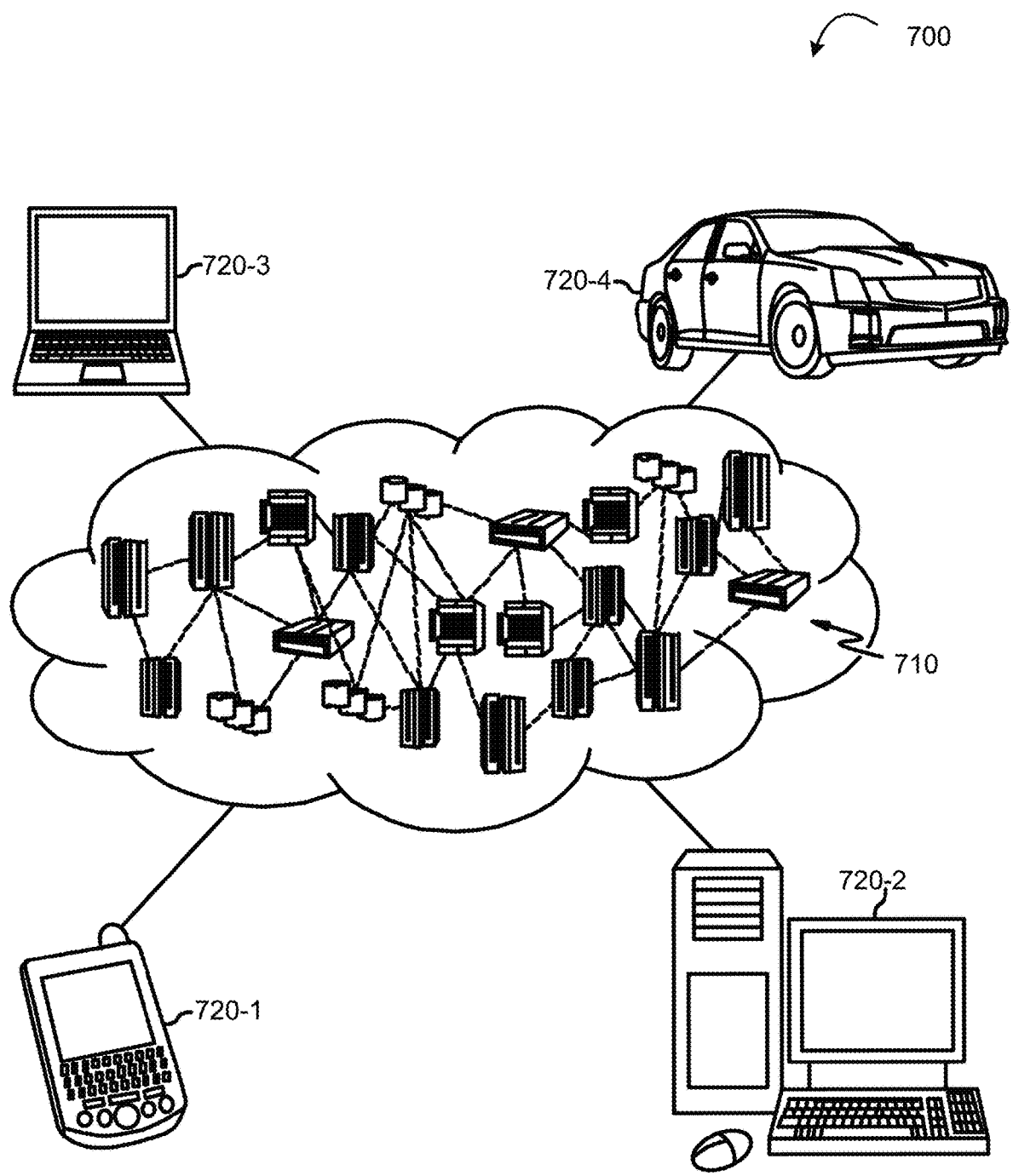
FIG. 7 depicts a cloud computing environment in accordance with embodiments of the present disclosure.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (P.D.A.) or cellular telephone 720-1, desktop computer 720-2, laptop computer 720-3, and/or automobile computer system 720-4 may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 720-1 to 720-4 shown in FIG. 7 are intended to be illustrative only and that computing nodes 710 and cloud computing environment 700 can communicate with any type of computerized device over any type of network and/or network addressable connection (e.g., using a web browser).

Figure 8:
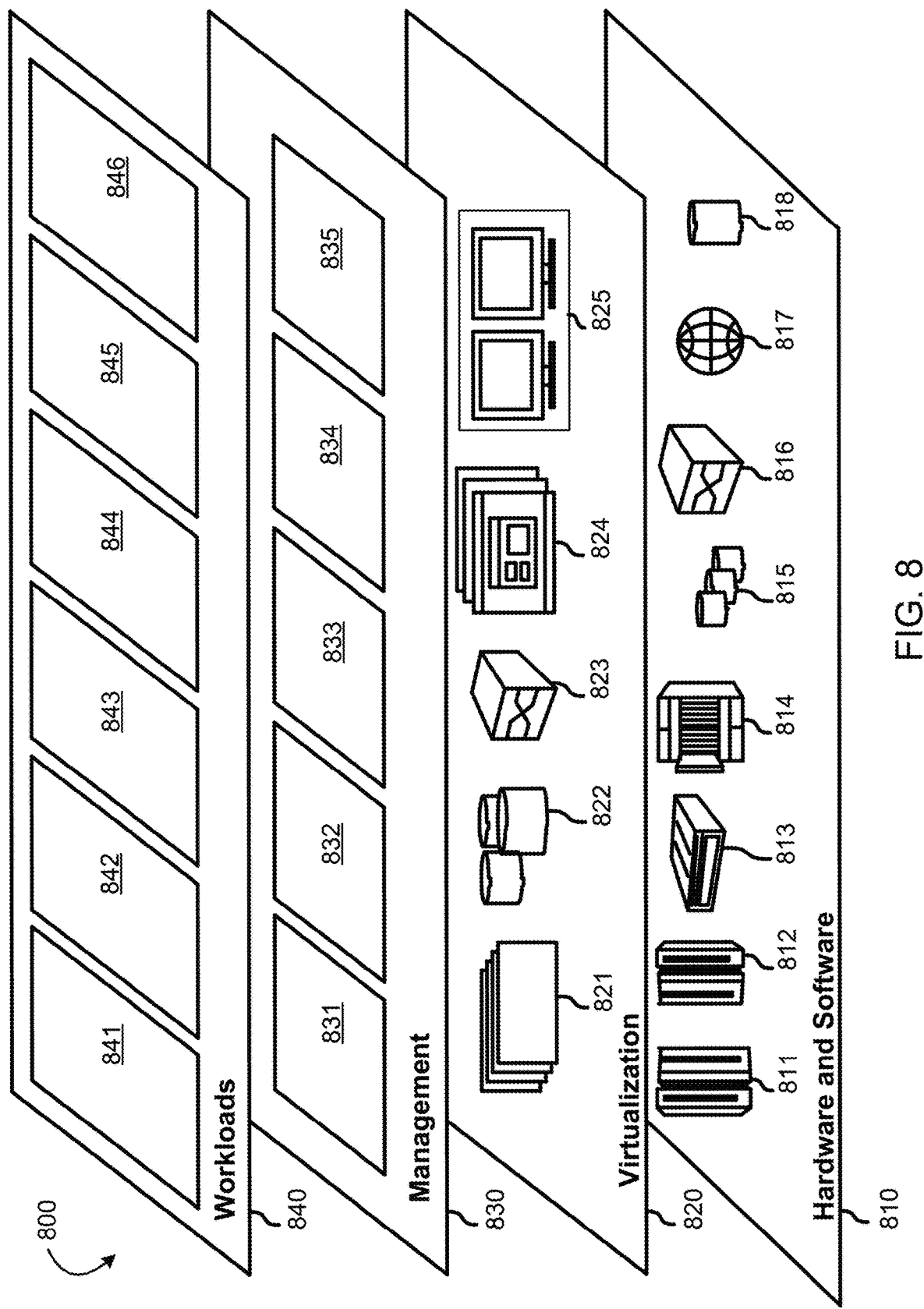
FIG. 8 depicts abstraction model layers in accordance with embodiments of the present disclosure.

Referring now to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 810 includes hardware and software components. Examples of hardware components include mainframes 811; RISC (Reduced Instruction Set Computer) architecture-based servers 812; servers 813; blade servers 814; storage devices 815; and networks and networking components 816. In some embodiments, software components include network application server software 817 and database software 818.

Virtualization layer 820 provides an abstraction layer from which the following examples of virtual entities may be provided: virtual servers 821; virtual storage 822; virtual networks 823, including virtual private networks; virtual applications and operating systems 824; and virtual clients 825.

In one example, management layer 830 may provide the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 833 provides access to the cloud computing environment for consumers and system administrators. Service level management 834 provides cloud computing resource allocation and management such that required service levels are met. Service Level Agreement (S.L.A.) planning and fulfillment 835 provide pre-arrangement for, and procurement of, cloud computing resources for which a future requirement is anticipated in accordance with an S.L.A.

Workloads layer 840 provides examples of functionality for which the cloud computing environment may be utilized. Examples of workloads and functions which may be provided from this layer include mapping and navigation 841; software development and lifecycle management 842 (e.g., link selector 300); virtual classroom education delivery 843; data analytics processing 844; transaction processing 845; and a threat similarity analysis system 846.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

It should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

Moreover, references to "models" or a "model" in the present description specifically refers to computer executed machine learning models. These models comprise algorithms, statistical models, and the like, that computer systems use to perform a specific task without using explicit instructions, but instead relying on patterns and inference instead. Machine learning algorithms build a computer executed model based on sample data, known as "training data", in order to make predictions or decisions without being explicitly programmed to perform the task. Examples of machine learning models include, but are not limited to, supervised machine learning models such as convolutional neural networks (CNNs), deep neural networks (DNNs), and the like, as well as unsupervised machine learning models such as Isolation Forest models, One-Class Support Vector Machine (SVM) models, Local Outlier Factor models, and the like, ensemble learning mechanisms such as Random Forest models, and the like.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of wireless connectivity of a user equipment (UE), the method comprising:
   detecting a connection attempt by the UE to a non-standalone (NSA) network including at least one base station and new radio (NR) stations;
   receiving connection data from the UE;
   connecting the UE to the base station;
   determining, by a prediction module, an NR station from the NR stations based on channel quality measurements relating to the NR stations and the connection data of the UE; and
   connecting the UE to the NR station determined by the prediction module.

2. The method of claim 1, wherein the channel quality measurements of the NR stations include cell range, uplink performance, cell capacity, link quality, and other quality aspects.

3. The method of claim 1, wherein the prediction module utilizes a machine learning model trained using channel quality measurements of the NR stations.

4. The method of claim 1, further comprising:
   receiving periodically, via a measurement module, updated channel quality measurements of the NR stations;
   evaluating the updated channel quality measurements by the prediction module using a machine learning model; and
   determining, by the prediction module, which of the NR stations to connect the UE to at a particular time of day.

5. The method of claim 1, further comprising:
   receiving periodically, via a measurement module, a timing advance from the UE;
   evaluating the timing advance by the prediction module using a machine learning model; and
   determining, by the prediction module, which of the NR stations to connect the UE to.

6. The method of claim 1, wherein timing advance is used to control an uplink transmission timing of the UE.

7. The method of claim 1, wherein the prediction module maintains a blacklist of other NR stations that should not be used when establishing the connection with the UE.

8. A system for link selection in a non-standalone (NSA) network including a base station and new radio (NR) stations, the system comprising:
   a memory;
   a processor;
   local data storage having stored thereon computer executable code, wherein the computer executable code includes program instruction executable by a processor to cause the processor to perform a method;
   a measurement module configured to obtain channel quality measurements of the NR stations in the NSA network;
   a training module configured to train a machine learning model using the channel quality measurements obtained by the measurement module; and
   a prediction module configured to deploy the machine learning model onto the NSA network for connecting user equipment (UE) to the NR stations.

9. The system of claim 8, wherein the prediction module is further configured to periodically receive updated channel quality measurements from the measurement module to retrain the machine learning model and continuously monitor the NR stations.

10. The system of claim 8, wherein the channel quality measurements include cell range, uplink performance, cell capacity, and link quality.

11. The system of claim 8, wherein the prediction module maintains a blacklist of other NR stations that should not be used when establishing the connection with the UE.

12. The system of claim 11, wherein other NR stations of the NR stations collocated with the base station are blacklisted based on a distance between the other NR stations and the UE being beyond a predetermined allowed distance.

13. The system of claim 11, wherein other NR stations of the NR stations non-collocated with the base station are blacklisted based on a distance between the other NR stations and the UE being beyond a predetermined allowed distance.

14. A computer program product including computer readable storage media of mitigating unauthorized encryptions, having computer executable instructions that when executed by at least one computer cause the at least one computer to execute the instructions to:
   detect, on a non-standalone (NSA) network including a base station and new radio (NR) stations, a connection attempt by the UE;
   receive connection data from the UE;
   connect the UE to the base station;
   determine, by a prediction module, an NR station from the NR stations based on channel quality measurements relating to the NR stations and the connection data of the UE; and connect the UE to the NR station determined by the prediction module.

15. The computer program product of claim 14, wherein the channel quality measurements of the NR stations include cell range, uplink performance, cell capacity, and link quality.

16. The computer program product of claim 14, wherein the prediction module utilizes a machine learning model trained using channel quality measurements of the NR stations.

17. The computer program product of claim 14, further comprising:
  receiving periodically, via a measurement module, updated channel quality measurements of the NR stations;
  evaluating the updated channel quality measurements by the prediction module using a machine learning model; and
  determining, by the prediction module, which of the NR stations to connect the UE to at a particular time of day.

18. The computer program product of claim 14, further comprising:
  receiving periodically, via a measurement module, a timing advance from the UE;
  evaluating the timing advance by the prediction module using a machine learning model; and
  determining, by the prediction module, which of the NR stations to connect the UE to at a particular time of day.

19. The computer program product of claim 14, wherein timing advance is used to control an uplink transmission timing of the UE.

20. The computer program product of claim 14, wherein the prediction module maintains a blacklist of other NR stations that should not be used when establishing the connection with the UE.

* * * * *